United States Patent [19]
Gordon

[11] 3,749,266
[45] July 31, 1973

[54] AIRCRAFT TOWING VEHICLE

[76] Inventor: Jerry Dale Gordon, 10765 E. 11th, Tulsa, Okla.

[22] Filed: Dec. 23, 1971

[21] Appl. No.: 211,327

[52] U.S. Cl. .............................................. 214/334
[51] Int. Cl. .......................................... B60p 29/00
[58] Field of Search .................... 214/330, 331, 332, 214/333, 334

[56] References Cited
UNITED STATES PATENTS

| | | | |
|---|---|---|---|
| 2,980,270 | 4/1961 | Elliott et al. ......................... | 214/334 |
| 3,291,422 | 12/1966 | Valkenburg ...................... | 244/114 R |
| 2,919,043 | 12/1959 | Sharp ................................. | 214/332 |
| 3,586,187 | 6/1971 | Wright ............................... | 214/332 |
| 3,662,911 | 5/1972 | Harman ............................. | 214/334 |

*Primary Examiner*—Gerald M. Forlenza
*Assistant Examiner*—Lawrence J. Oresky
*Attorney*—Irvin S. Thompson et al.

[57] ABSTRACT

An aircraft towing vehicle has a central well closed by a gate that swings down to form a ramp and that is pushed under the nose wheel unit of the aircraft while the other wheels of the aircraft are locked. Power-operated jaws on the sides of the well clamp the nose wheel unit between them; and when the unit is a tandem unit, then a power-operated ram bar at the inner end of the well secures the unit between the ram bar and the closed gate. The vehicle is steerable by driving for pivoting about the vertical pivotal axis of the nose wheel.

5 Claims, 7 Drawing Figures

INVENTOR.
Jerry D. Gordon
BY
Young + Thompson
ATTORNEYS

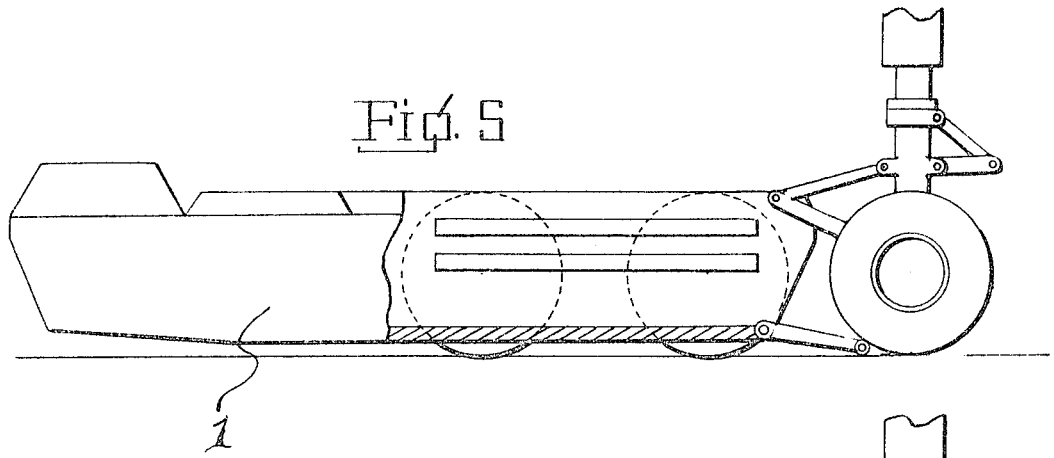
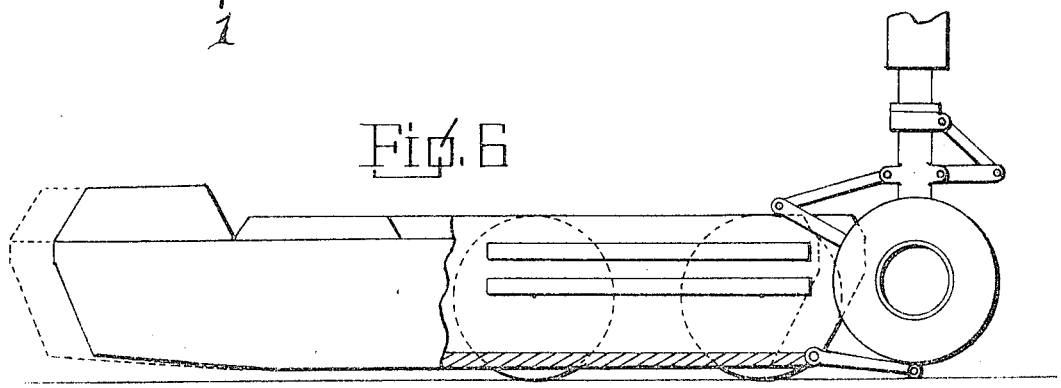
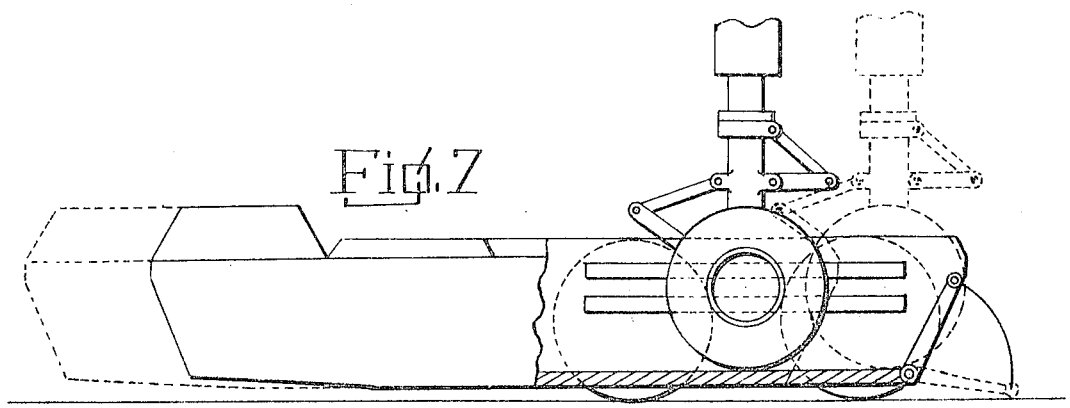

AIRCRAFT TOWING VEHICLE

The present invention relates to aircraft towing vehicles, more particularly of the type that support the nose wheel of the aircraft for towing the aircraft by application of a power source external to the aircraft.

An object of the present invention is to provide an aircraft towing vehicle, which readily accepts the weight of the nose wheel unit of an aircraft to be towed.

Another object of the present invention is the provision of an aircraft towing vehicle which can be entirely operated by a single person from an operator's cab.

Still another object of the present invention is the provision of an aircraft towing vehicle in which the nose wheel unit of the aircraft can be firmly gripped by the vehicle.

Finally, it is an object of the present invention to provide an aircraft towing vehicle which will be relatively simple and inexpensive to manufacture, easy to operate, maintain and repair, and rugged and durable in use.

Other objects and advantages of the present invention will become apparent from a consideration of the following description, taken in connection with the accompanying drawings, in which:

FIGS. 5, 6 and 7 are views similar to FIG. 2 but with parts broken away to show the successive stages of operation of the vehicle relative to the nose wheel unit of an aircraft to be towed.

Figure 1:
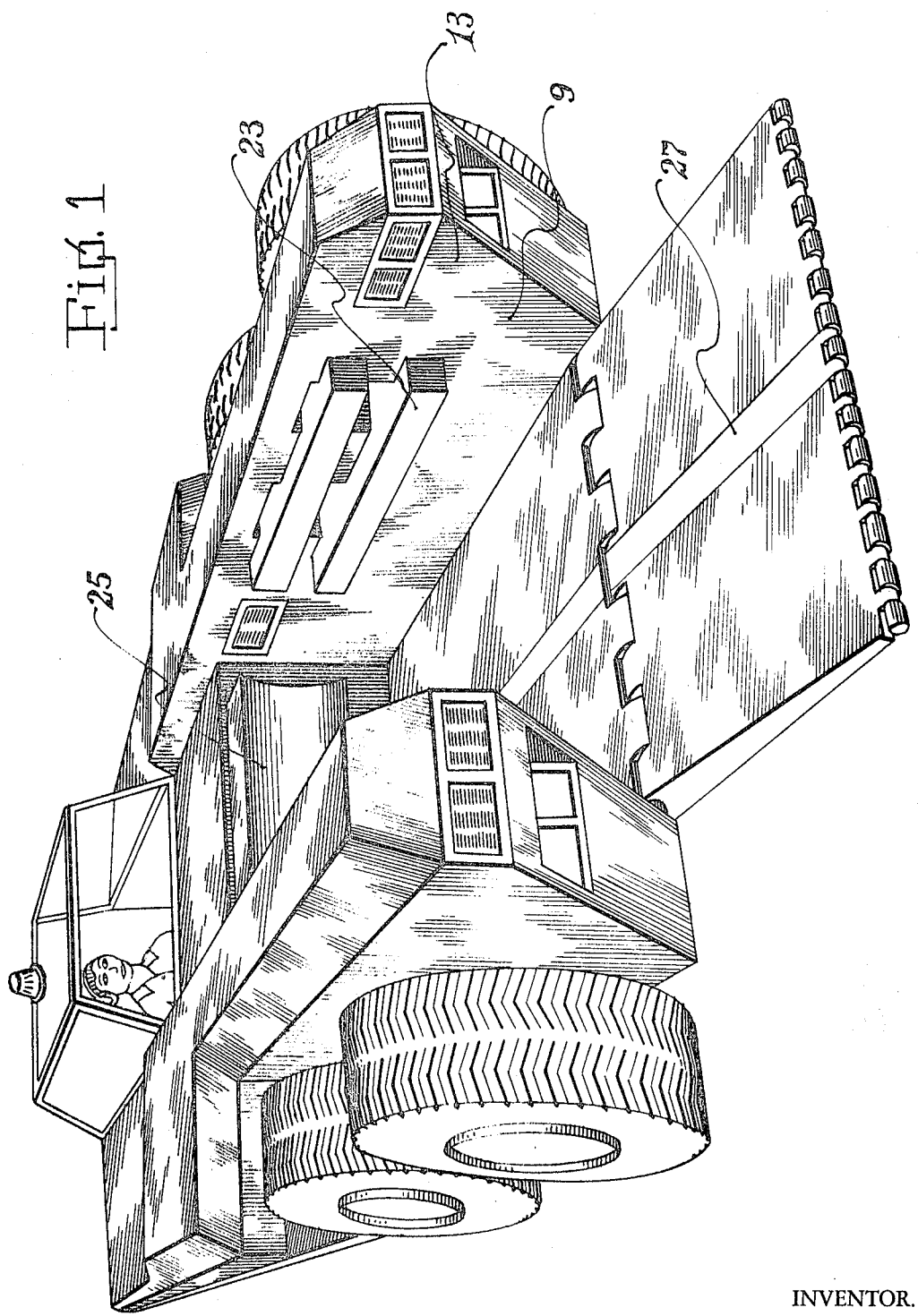
FIG. 1 is a front perspective view of an aircraft towing vehicle according to the present invention, with the ramp or end gate lowered.
Figure 2:
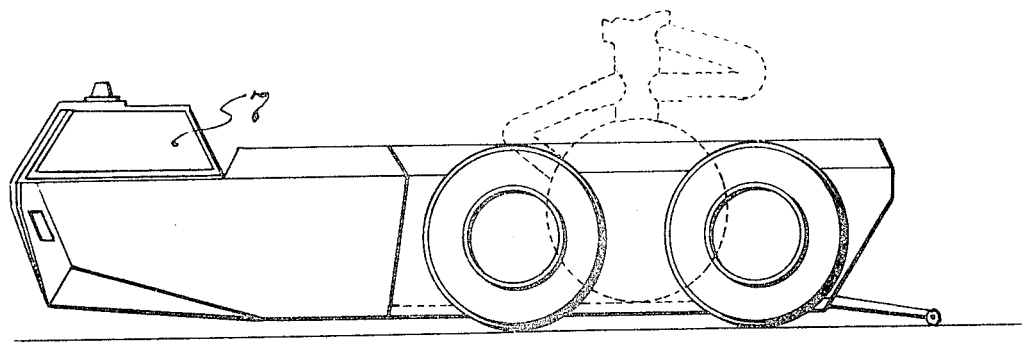
FIG. 2 is a side elevational view of the vehicle in the position shown in FIG. 1.
Figure 3:
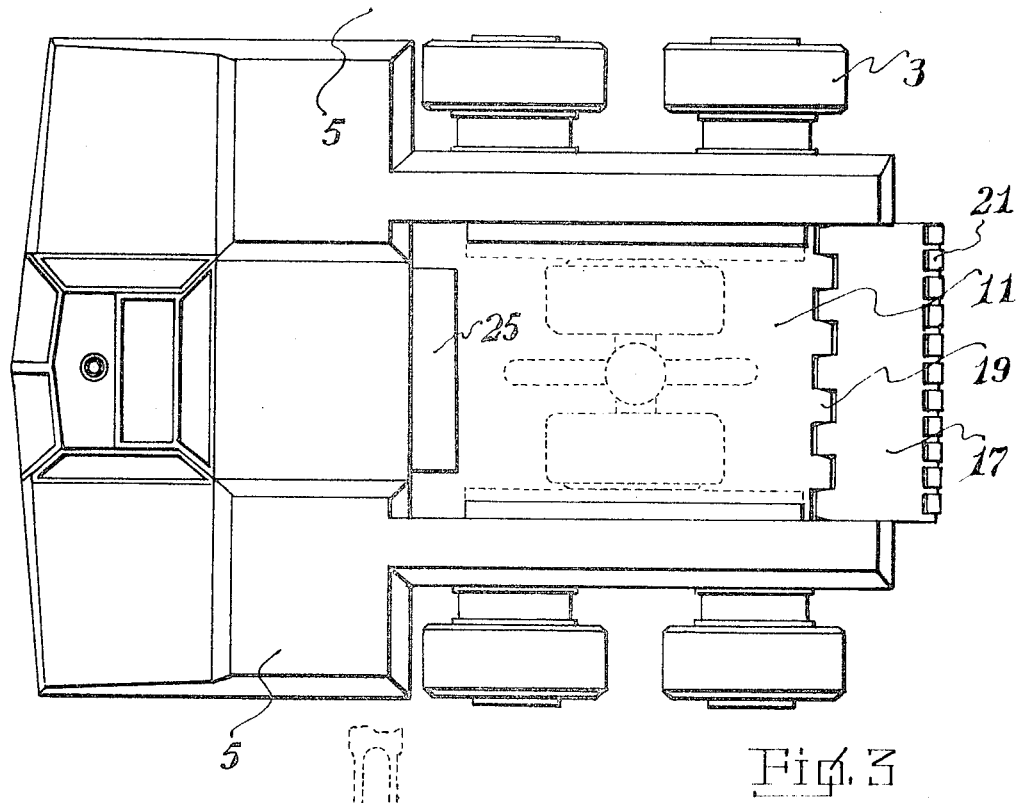
FIG. 3 is a top plan view of the vehicle in the position shown in FIGS. 1 and 2.
Figure 4:
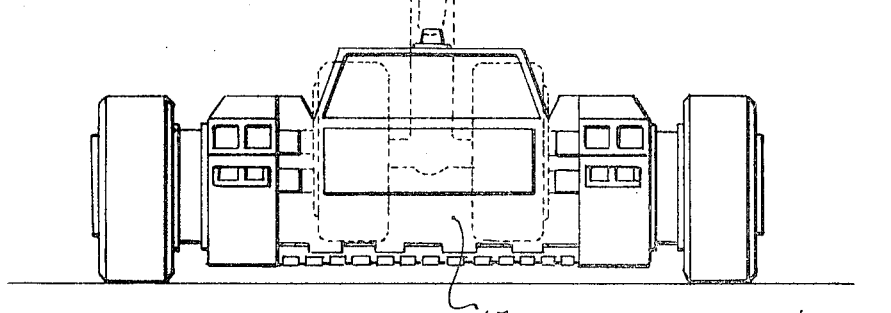
FIG. 4 is a front elevational view of the vehicle.

Referring now to the drawings in greater detail, there is shown an aircraft towing vehicle according to the present invention, comprising a heavy-duty vehicle chassis 1 supported on wheels 3 disposed two on either side of the chassis. The wheels on each side of the vehicle are separately driven by diesel power housed at 5, so that the vehicle is steerable by driving. An operator's cab 7 at the central rear of the vehicle positions the operator at a sufficient elevation to see the entire operation of the vehicle.

Between the wheels 3 on each side of the vehicle is a central well 9 for the reception of a nose wheel unit of the plane to be towed. Well 9 is closed at its bottom by a bottom plate 11 that is as close as practical to the ground and is of a strength sufficient to support the nose wheel unit of the aircraft to be towed and that portion of the weight of the aircraft which is borne by the nose wheel unit. Well 9 is bounded laterally by side walls 13 and by a rear end wall 15. The front end of well 9 can be opened and closed by a vertically swinging end gate 17 actuated by conventional fluid-pressure means (not shown). Gate 17 is mounted for vertical swinging movement on and about a hinge 19 at the forward edge of bottom plate 11. Along its free edge, gate 17 carries anti-friction rollers 21 which support the free edge of the gate on the ground and also reduce the friction when the free edge of the gate contacts the nose wheel unit of the aircraft to be towed.

Mounted on side walls 13, and horizontally displaceable in a direction perpendicular to those side walls and toward and away from each other, are a plurality of vertically spaced horizontal jaws 23 actuated by conventional fluid-pressure means (not shown), for the purpose of grasping between them and subsequently releasing the nose wheel unit of the aircraft to be towed. Similarly, a horizontal ram bar 25 having a concave forward surface is extensible and retractable away from and toward end wall 15, for the purpose of peripherally contacting the tires of a nose wheel unit when the nose wheel unit is of the tandem type shown in phantom line in FIGS. 5-7.

Bottom plate 11 and end gate 17 have a centerline guide 27 thereon of a distinctively different appearance from the rest of the structure, so that the operator can visually determine when the vehicle is centered on the nose wheel unit of the aircraft to be towed, and hence is in position to receive that unit.

In operation, the vehicle is driven to the vicinity of the aircraft to be towed and is steered until it is lined up with the nose wheel unit of the aircraft, that is, the tires of the vehicles are parallel to the tires of the nose wheel unit. The end gate 17 is then dropped and the vehicle is moved into the FIG. 5 position. The brake of the nose wheel unit is released, and the brakes of the other wheels of the aircraft are set, whereupon the vehicle is advanced to force end gate 17 beneath the nose wheel unit as seen in FIG. 6. The advance of the vehicle is continued until the FIG. 7 position is achieved, whereupon the weight of the nose wheel unit and that portion of the aircraft weight that it supports is borne entirely by bottom plate 11 of the vehicle.

The jaws 23 are then extended toward each other until they grip between them the nose wheel unit. During loading of the nose wheel unit, the operator visually makes use of centerline guide 27 to ensure that the nose wheel unit is loaded on dead center, and so the jaws 23 grip the nose wheel unit substantially simultaneously.

The end gate 17 is raised and with the brakes of the other wheels of the aircraft released, the vehicle is then driven to tow the aircraft. If it is desired to tow the aircraft in a direction different from the direction indicated by the wheels upon loading, then it is possible to turn the unit by driving the wheels on one side of the vehicle while braking or reversing the direction of rotation of the wheels on the other side of the vehicle, thereby to swing the loaded vehicle as a whole about the upright axis of the nose wheel unit.

When the nose wheel unit is a tandem unit as indicated in phantom line particularly in FIG. 5, then in addition to grasping the nose wheel unit laterally, the nose wheel unit is grasped fore and aft, between ram bar 25 which can be advanced for this purpose and the raised end gate 17.

To unload the vehicle when the aircraft has been towed to its destination, it is of course necessary only to retrace the previous steps: the brakes of the ground-supported wheels of the aircraft are set; end gate 17 is lowered; and with the brake of the nose wheel unit released, the vehicle is driven out from under the aircraft, whereby the weight of the nose wheel unit and the portion of the aircraft supported thereby is transferred successively from the bottom plate 11 to the lowered end gate 17 and thence to the ground.

From a consideration of the foregoing disclosure, therefore, it will be evident that all of the initially recited objects of the present invention have been achieved.

Although the present invention has been described and illustrated in connection with a preferred embodiment, it is to be understood that modifications and variations may be resorted to without departing from the spirit of the invention, as those skilled in this art will readily understand. Such modifications and variations are considered to be within the purview and scope of the present invention as defined by the appended claims.

Having described my invention, I claim:

1. An aircraft towing vehicle, comprising a chassis, a plurality of wheels on each side of the chassis, means defining a well between the wheels, a bottom plate closing the bottom of the well and disposed close to the ground, a vertically swinging end gate closing one end of the well, power means to swing said end gate vertically, and a ram bar on a wall bounding said well at the end of said well opposite said end gate, said ram bar being movable toward and away from said end gate to grip between said ram bar and said end gate a nose wheel unit of an aircraft to be towed when said end gate is in a raised position.

2. A vehicle as claimed in claim 1, and power-operated jaws on opposite sides of the well movable toward and away from each other to grasp between them the nose wheel unit of an aircraft to be towed.

3. A vehicle as claimed in claim 2, said jaws being horizontal and parallel to the direction of travel of the vehicle.

4. A vehicle as claimed in claim 3, there being a plurality of said jaws vertically spaced apart on each side of said well.

5. A vehicle as claimed in claim 1, and an operator's cab adjacent the other end of the well.

* * * * *